Sept. 12, 1933.    R. H. MUELLER ET AL    1,926,752
METER HANGER
Filed July 8, 1932
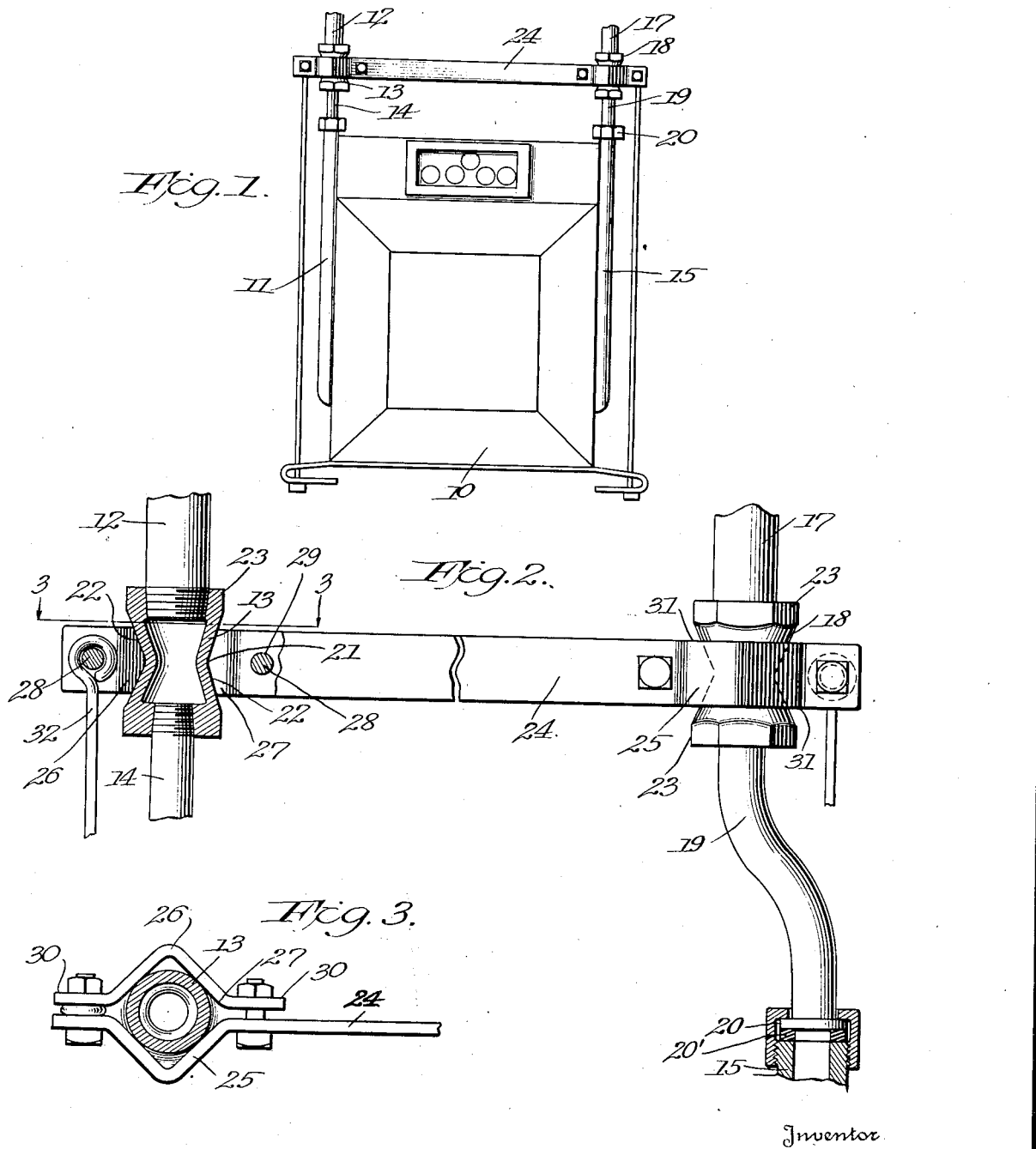
Inventor
Robert H. Mueller
Arlon V. Cushman
By Cushman, Byant, Darby & Cushman
Attorneys Patented Sept. 12, 1933

1,926,752

UNITED STATES PATENT OFFICE 1,926,752

METER HANGER

Robert H. Mueller, Decatur, Ill., and Arlon V. Cushman, Washington, D. C., assignors to Mueller Co., Decatur, Ill., a corporation of Illinois Application July 8, 1932. Serial No. 621,484

3 Claims. (Cl. 285—3)

The present invention relates to a meter hanger and, more particularly, to a meter hanger the parts of which are adaptable to correct faulty alignment of the pipes to be connected to the meter.

Difficulties are frequently encountered in installing gas meters and providing for their support because of the fact that the supply and service pipes to which the meter is connected are seldom exactly parallel. The inlet and outlet pipes or spuds extending from the meter are formed rigid with the meter and, for this reason, the end of the supply pipe from the mains and the end of the house service pipe must be brought into alignment with the ends of the rigid meter spuds at the meter supporting bar. If the supply pipe and house service pipe are not exactly parallel or properly spaced, when their ends are brought into alignment with the rigid meter spuds, the pipes themselves will be at a slight angle with respect to each other and also with respect to the spuds and if no provision is made at the meter supporting bar for this angular relation, the pipes held in the bar will be under a considerable strain. This strain may cause distortion or breakage of the threads of the joints between the various connections in the piping and leakage of gas may result.

The principal object of the present invention is to produce a meter hanger which will permit of a rigid and leak-proof connection of the piping to the meter, regardless of whether the various pipes are exactly aligned.

Another object of the invention is to provide a meter hanger and a connecting element associated therewith which are adjustable with respect to each other so that the piping may be rigidly and securely clamped in the meter bar regardless of whether the pipes are in exact alignment.

Still another object of the invention is to provide a meter hanger and a connecting element associated therewith which are so constructed that the pipe connection may be loosely supported in the meter hanger during the operation of connecting the meter to the service and supply pipes, thereby facilitating this operation.

A further object of the invention is to provide a meter supporting bar of very simple construction and one which will be relatively inexpensive, and, moreover, to provide a structure which may be applied in a very short period of time and by a workman who need not be particularly skilled.

The invention is particularly characterized by the absence of the so-called "sleeve" connections which are well known in the art and which require a very exact seating between the sleeve and the opening in the bar. In this prior art construction, when the pipes are not in perfect alignment, the severe strains to which the hanger is subjected cannot be absorbed and breakage of the threaded ends of the service pipes quite frequently results.

In the drawing,

Figure 1 is a front elevation showing the meter supported by the hanger of our invention;

Figure 2 is a front elevation showing the manner in which the supporting bar is fixed to the pipes, one end of the supporting bar and the piping at that end being shown in section and the piping at the other end of the bar being turned with respect to the Figure 1 showing; and Figure 3 is a horizontal section on the line 3—3 of Figure 2.

Referring to the drawing, the numeral 10 indicates the meter provided with an inlet pipe or spud 11 to which the supply pipe 12 is connected by means of a coupling or connection 13 threaded upon the supply pipe and a coupling nipple 14 which joins the lower end of the connection 13 and the upper end of the meter inlet pipe 11. The outlet pipe or spud 15 of the meter is connected to the service pipe 17 by a coupling or connection 18 threaded upon the latter and a bent or offset coupling nipple 19 threadedly connected to the connection 18 and having a swivel connection 20 with the outlet pipe 15. The swivel connection includes a compressible washer 20'.

The connections 13 and 18 are provided with a contracted portion 21 intermediate their lengths, the inclined walls 22 of the contracted portions preferably being smooth or straight as shown in Figure 2. The contracted portions 21 are circular in cross-section through any point in their length. The outer surfaces of the ends 23 of the connections 13 and 18 are flattened to be hexagonal in cross-section, so that they may be engaged by a wrench.

The meter supporting bar 24 is supported upon the connections 13 and 18 and may be formed of either pressed or cast metal. The bar 24 is provided with substantially V-shaped horizontally offset portions 25 adjacent each end thereof and V-shaped brackets 26 are secured to the bar 24 opposite each of the offset portions 25 to provide clamps 27 at each end of the bar which engage the connections 13 and 18. The brackets 26 are connected to the bar 24 by means of bolts 28 extending through apertures 29 in the bar 24 and through aligned apertures 29 in laterally projecting ears 30 formed upon the brackets 26. As is shown in Figure 2 of the drawing, the upper and lower edges 31 of the clamps 27 engage the inclined walls 22 of the connections 13 and 18.

A hanger 32 is supported from the bolts 28 as shown in Figure 3.

The method of installing a meter to be supported by our meter hanger is as follows: In order to connect the meter 10 with the supply and service pipes, the connection 13 is threaded upon the supply pipe 12 and the connection 18 is threaded upon the service pipe 17, the bar 24 being loosely supported upon the connections 13 and 18. The nipples 14 and 19, threaded to the inlet and outlet pipes or spuds fixed to the meter 10, are then threaded into the connections 13 and 18 to the desired extent and the brackets 26 of the clamps 27 are then tightly clamped about the connections 13 and 18. Any misalignment of the pipes 12 and 17 will be accommodated by the adjustment which can be obtained between the clamps 27 and the bar 24 with respect to the connections 13 and 18, i. e., the connections may tilt slightly with respect to the bar. Misalignment may also be corrected to some extent in the swivel connection 20, the compressible washer 20' permitting the nipple 19 to be connected to spud 15 at a slight angle.

Because of the substantially rectangular formation of the clamps 27 which contact with the transversely circular and inclined walls 22 of the connections 13 and 18, as well as because of the fact that the walls of the clamps are vertically straight while the walls of the connections are concaved, the bar can be adjusted with respect to the connections to extend in a truly horizontal plane and rigidly support the meter in a level position. Since the bar is freely adjustable with respect to the connections, no undue strains can be set up at any point in the piping to the meter and there can be no possibility of any leakage at any of the joints. As the bar can be rigidly attached to the connections 13 and 18, all possibility of the meter swinging with reference to the connections is obviated.

The arrangement of our meter hanger and the connecting element whereby the meter hanger may be loosely supported upon the connecting element or elements 13 and 18 during the preliminary operation of connecting the meter to the piping is particularly advantageous, in that it enables all of the various piping and connection elements to be loosely connected and loosely supported in a position substantially identical with that which they will subsequently occupy with respect to each other. With the parts in this position, the installer may readily vary the various parts with respect to each other to obtain the exact final and rigid adjustment which is desired.

We claim:

1. A meter hanger comprising a bar member having at one end thereof means for engaging a conduit element and provided at the other end with pipe connection engaging means, said engaging means providing a substantially rectangular aperture through the bar member, and a pipe connection adapted to be held by said engaging means, said pipe connection being substantially circular in cross-section and having a contracted portion intermediate its ends of greater length than the width of the engaging means, said contracted portion having inwardly inclined walls adapted to be engaged by said engaging means intermediate the ends thereof.

2. A meter hanger comprising a bar member having at one end thereof means for engaging a conduit element and provided at the other end with pipe connection engaging means, said engaging means providing a substantially rectangular aperture through the bar member, and a pipe connection adapted to be held by said engaging means, said pipe connection being substantially circular in cross-section and having a contracted portion intermediate its ends, said contracted portion consisting of upper and lower reversely arranged conical portions presenting exterior inclined walls adapted to be engaged by said engaging means intermediate the ends thereof.

3. A meter hanger comprising a one-piece bar provided with substantially V-shaped horizontal offset portions adjacent each end thereof, substantially V-shaped clamping brackets cooperating with the offset portions of said bar to form rectangular pipe connection engaging means, and pipe connections adapted to be held by said engaging means, each pipe connection being substantially circular in cross-section and having a contracted portion intermediate its ends, said contracted portion having inwardly inclined walls adapted to be engaged by said engaging means.

ROBERT H. MUELLER.
ARLON V. CUSHMAN.